M. B. PARK.
NUT LOCK.
APPLICATION FILED FEB. 10, 1909.

932,894.

Patented Aug. 31, 1909.

Witnesses
F. L. Ourand
M. K. Freeman

Inventor
Mendal B. Park
By Louis Bagger & Co
his Attorneys

UNITED STATES PATENT OFFICE.

MENDAL B. PARK, OF COUNCIL BLUFFS, IOWA.

NUT-LOCK.

932,894.

Specification of Letters Patent.

Patented Aug. 31, 1909.

Application filed February 10, 1909. Serial No. 477,203.

*To all whom it may concern:*

Be it known that I, MENDAL B. PARK, a citizen of the United States, residing at Council Bluffs, in the county of Pottawattamie and State of Iowa, have invented certain new and useful Improvements in Nut-locks, of which the following is a specification.

My invention relates to an improvement in nut locks, and the object is to provide means for engaging the nut after it has been screwed upon the bolt for holding it in locked position. The nut can be screwed upon the bolt and on to the locking means, but cannot be removed from the bolt without breaking the locking means.

The invention consists of certain novel features of construction and combinations of parts which will be hereinafter described and pointed out in the claim.

Figure 1:
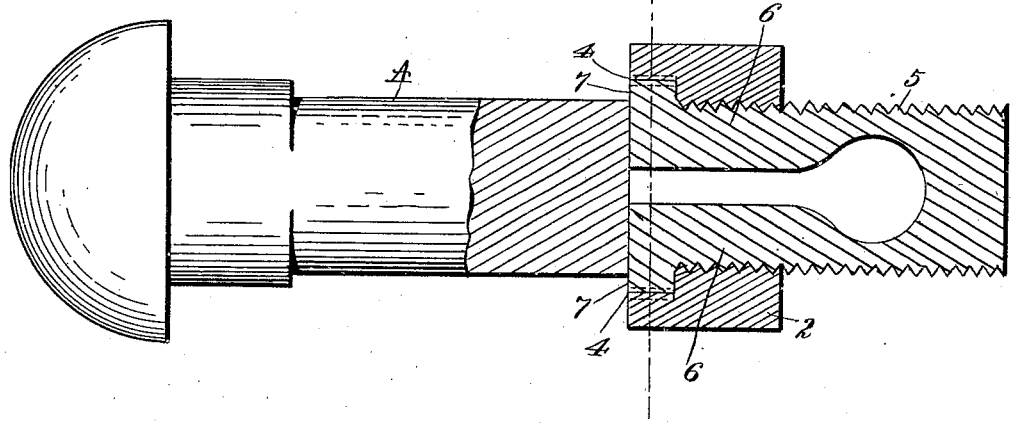
Figure 2:
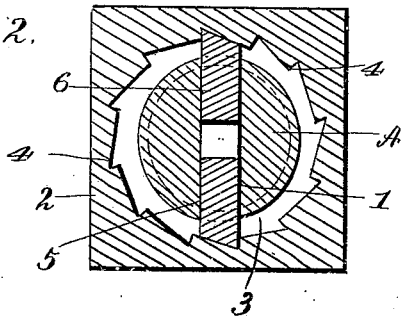
Figure 3:
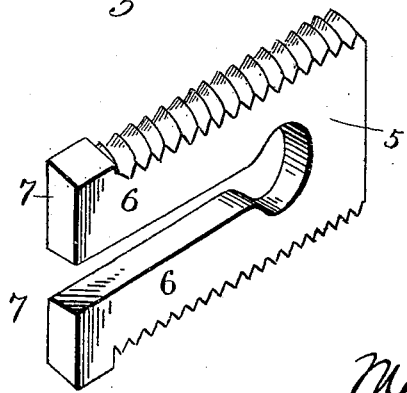

In the accompanying drawings—Figure 1 is a longitudinal, vertical section through the nut and bolt; Fig. 2 is a cross sectional view through the nut and bolt and locking means, and Fig. 3 is a perspective view of the locking means.

A, represents the bolt, which is provided with a split end forming a recess 1. A nut 2 has a cavity 3 formed at its inner end and the wall of the cavity is provided with ratchet teeth 4. Received in the split end of the bolt is a U-shaped key 5, which is provided with two spring or resilient arms 6, 6. The key is adapted to extend the entire length of the recess 1. The spring arms are provided at their ends with projections 7, which are received in the cavity 3 of the nut. The outer surfaces of the projections are beveled in opposite directions to each other. The projections are adapted to engage the ratchet teeth, and the nut is capable of being screwed on and over these projections, but the nut cannot be removed from the bolt without exerting sufficient pressure to break off one of the projections. The projections being beveled opposite to each other, form a locking engagement with the ratchet teeth of the nut, which prevents the nut from being removed from the bolt.

The recess 1 on the bolt receives the key 5, which is provided with screw threads, and the nut 2 is screwed over the key upon the bolt A until the projections 7 of the spring arms 6 on the key are received in the cavity 3 of the nut 2. The projections 7 are adapted to engage the ratchet teeth 4 formed in the wall of the cavity 3 as the nut is screwed upon the bolt and key and the fact that the arms are resilient the nut can be screwed over the projections until it has been screwed sufficiently upon the bolt when the projections will engage the ratchet teeth, and thereby lock the nut 2 upon the bolt A. When it is desired to remove the nut it is necessary to compress the arms 6 together, whereby the projections 7 will become disengaged from the ratchet teeth of the nut thereby permitting the nut to be unscrewed from the bolt and key.

It is evident that more or less slight changes might be made in the form and arrangement of the several parts described without departing from the spirit and scope of my invention, and hence I do not wish to be limited to the exact construction herein set forth, but:—

Having fully described my invention, what I claim as new and desire to secure by Letters Patent is:

A lock nut comprising a bolt having a split end, a key having flexible arms received in the split end of the bolt, projections on the arms, the nut adapted to be screwed on to the bolt and key, having a cavity formed on its inner end in which the projections on the arms are received, and ratchet teeth formed in the cavity of the nut adapted to be engaged by the projections for preventing the nut from turning in but one direction and from being removed.

In testimony whereof I affix my signature, in the presence of two witnesses.

MENDAL B. PARK.

Witnesses:
W. F. SAPP,
A. W. ASKWITH.